(12) United States Patent
Sasaki

(10) Patent No.: US 10,291,818 B2
(45) Date of Patent: May 14, 2019

(54) IMAGE PROCESSING CIRCUIT FOR MULTI-DROP INKJET HEAD

(71) Applicant: RISO KAGAKU CORPORATION, Tokyo (JP)

(72) Inventor: Yasutaka Sasaki, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/686,543

(22) Filed: Aug. 25, 2017

(65) Prior Publication Data

US 2018/0084147 A1     Mar. 22, 2018

(30) Foreign Application Priority Data

Sep. 20, 2016   (JP) .................................. 2016-183059

(51) Int. Cl.
*H04N 1/60*     (2006.01)
*H04N 1/401*    (2006.01)
(Continued)

(52) U.S. Cl.
CPC ........ *H04N 1/4015* (2013.01); *B41J 2/04508* (2013.01); *B41J 2/04586* (2013.01); *G06K 15/102* (2013.01); *H04N 1/603* (2013.01)

(58) Field of Classification Search
CPC .. H04N 1/4015; H04N 1/603; H04N 1/40087; H04N 1/52; B41J 2/04586;
(Continued)

(56) References Cited

U.S. PATENT DOCUMENTS 6,181,444 B1*  1/2001  Sato ..................... H04N 1/4072
                                                       358/519
7,296,866 B2   11/2007  Ikemoto et al.
(Continued)

FOREIGN PATENT DOCUMENTS

CN          1603115 A     4/2005
CN        101588435 A    11/2009
(Continued)

OTHER PUBLICATIONS

Mar. 7, 2018 European Search Report in corresponding European Application No. 17190328.9.
(Continued)

*Primary Examiner* — Sharon A. Polk
(74) *Attorney, Agent, or Firm* — Greenblum & Bernstein, P.L.C.

(57) ABSTRACT

A calculator performs in parallel gamma correction calculations on gray level values 1 to Z depending on each of target nozzles for each of target pixels containing gray level values other than zero of pixels in image data to be printed by a multi-drop inkjet head including nozzles and having a maximum droplet number Z per pixel, the nozzles of the multi-drop inkjet head including the target nozzles for ink ejection on the respective target pixels. A selector selects a calculation result corresponding to a gray level value of the target pixel from calculation results of the gamma correction calculations performed on the gray level values 1 to Z by the calculator, for each of the target pixels.

5 Claims, 3 Drawing Sheets

(51) Int. Cl.
*B41J 2/045* (2006.01)
*G06K 15/10* (2006.01)

(58) Field of Classification Search
CPC .... B41J 2/04508; B41J 2/2132; B41J 2/2139;
B41J 29/393; G06K 15/102; G06K 15/107
See application file for complete search history.

(56) References Cited

U.S. PATENT DOCUMENTS

| | | |
|---|---|---|
| 8,305,634 B2 | 11/2012 | Nakayama et al. |
| 8,919,907 B1 | 12/2014 | Shimomura |
| 2008/0170279 A1 | 7/2008 | Kurigata |
| 2008/0252791 A1* | 10/2008 | Mitsunaga ............... H04N 5/20 348/673 |
| 2011/0148911 A1 | 6/2011 | Yamasaki et al. |
| 2017/0232758 A1 | 8/2017 | Inagawa |

FOREIGN PATENT DOCUMENTS

| | | |
|---|---|---|
| EP | 1 517 264 A2 | 3/2005 |
| JP | 2011-130136 | 6/2011 |

OTHER PUBLICATIONS

Chinese Office Action dated Jan. 23, 2019 in the counterpart Chinese application No. 201710851209.2.

* cited by examiner

IMAGE PROCESSING CIRCUIT FOR MULTI-DROP INKJET HEAD

CROSS REFERENCE TO RELATED APPLICATION

This application is based upon and claims the benefit of priority from the prior Japanese Patent Application No. 2016-183059, filed on Sep. 20, 2016, the entire contents of which are incorporated herein by reference.

BACKGROUND

1. Technical Field

The disclosure relates to an image processing circuit configured to perform correction on image data to be printed by an inkjet head.

2. Related Art

The multi-drop inkjet head can eject multiple ink droplets per pixel from each nozzle. The multi-drop inkjet head performs gradation printing in which density is expressed by the number of ink droplets (droplet number) ejected per pixel.

SUMMARY

In an inkjet head, obtaining uniform output characteristics across nozzles is difficult and ejection characteristics vary among the nozzles. This variation in the ejection characteristics among the nozzles causes uneven density in a print image. In order to correct the variation in the ejection characteristics among the nozzles, it is conceivable to perform gamma correction per nozzle.

An example of an image processing circuit which performs this gamma correction is illustrated in FIG. 1. The image processing circuit 100 illustrated in FIG. 1 is implemented (packaged) in a field programmable gate array (FPGA).

The image processing circuit 100 mainly includes a gain table selector 101 and a multiplier 102. The image processing circuit 100 has a RAM 103 and holds gain tables for the gamma correction in the RAM 103. The RAM 103 holds the gain tables for the respective nozzles in the inkjet head.

The gain table selector 101 sequentially receives gray level values (droplet numbers) for respective pixels in the image data being raster data, via an input terminal 104. In the gain table selector 101, each of the received gray level values is temporarily held by a flip-flop 111 and is then inputted into a multiplexer (MUX) 112 and a flip-flop 113.

The multiplexer 112 obtains, from the RAM 103, a gain value stored in association with the inputted gray level value in the gain table for the nozzle that is in charge of ink ejection for the pixel whose gray level value is inputted. The gain value obtained by the multiplexer 112 is inputted into a flip-flop 114.

The gray level value inputted into the flip-flop 113 and the gain value inputted into the flip-flop 114 are temporarily held in the flip-flops 113, 114 and are then inputted into a multiplying unit 115 of the multiplier 102.

The multiplying unit 115 multiplies the gray level value by the gain value. The calculation result of the multiplying unit 115 is a gamma correction result. The gamma correction result is temporarily held by a flip-flop 105 and is then outputted to a circuit in a subsequent stage by an output terminal 106.

The multiplying unit 115 of the image processing circuit 100 is formed of a circuit utilizing a hardware multiplier (hardware macro) incorporated in the FPGA. This design is advantageous in terms of calculation processing speed. However, the hardware multiplier is confined to a limited position in the FPGA, and delay occurs in signal wiring to this position. Accordingly, in the gamma correction, it is so difficult to increase an overall operation clock rate that the processing speed is low.

Meanwhile, when the multiplier 115 is implemented as a software multiplier, a logic circuit with a multistage configuration needs to be formed. Also in this case, the operation clock rate is difficult to increase and the processing speed is low. In order to increase the operation clock rate, it is necessary to use a high-cost FPGA on which a high-speed circuit or a large-scale circuit is mounted. Using such a FPGA leads to increases in power consumption and circuit scale.

In techniques related to the gamma correction, there is an image processing circuit described in Japanese Unexamined Patent Application Publication No. 2011-130136. In the image processing circuit, a lookup table (LUT) of gamma correction results for all possible gray level values as inputs is stored in a RAM. Then, when receiving an input signal, the image processing circuit indirectly performs (executes) the gamma correction by referring to the LUT.

The aforementioned image processing circuit of Japanese Patent Application Publication No. 2011-130136 performs the gamma correction on the image signal in accordance with characteristics of a display device and the like. When this method is applied to gamma correction for correcting variations in ejection characteristics among nozzles of an inkjet head, the gamma correction for all possible gray level values are performed in each nozzle, and the results of the gamma correction are stored. Accordingly, a large capacity of memory is necessary and increasing the speed of this processing is difficult. Hence, this method requires a high-cost FPGA to achieve high speed processing, and leads to increases in power consumption and circuit scale.

An object of the disclosure is to provide an image processing circuit which can improve the processing speed of gamma correction while suppressing increases in power consumption and circuit scale.

An image processing circuit in accordance with some embodiments includes: a calculator configured to perform in parallel gamma correction calculations on gray level values 1 to Z depending on each of target nozzles for each of target pixels containing gray level values other than zero of pixels in image data to be printed by a multi-drop inkjet head including nozzles and having a maximum droplet number Z per pixel, the nozzles of the multi-drop inkjet head including the target nozzles for ink ejection on the respective target pixels; and a selector configured to select a calculation result corresponding to a gray level value of the target pixel from calculation results of the gamma correction calculations performed on the gray level values 1 to Z by the calculator, for each of the target pixels.

In the aforementioned configuration, the gamma correction calculations for the gray level values 1 to Z performed in the calculator are calculations in which the multiplicands (gray level values) are fixed. Accordingly, the calculations can be achieved without using a hardware multiplier in a FPGA. This can avoid signal wiring delay due to limitations in the position of the hardware multiplier in the FPGA which occurs when the hardware multiplier is used to perform the gamma correction calculations.

Accordingly, the processing speed of the gamma correction can be increased by using a low-cost FPGA instead of a high-cost FPGA on which a high-speed circuit or a large-scale circuit is mounted. Hence, it is possible to increase the processing speed of the gamma correction while suppressing increases in power consumption and circuit scale which occur when a high-cost FPGA is used.

Moreover, in the image data to be printed by the multi-drop inkjet head, the number of gray levels is limited to a certain extent. Accordingly, the circuit scale of the calculator can be suppressed when a low-cost FPGA is configured such that the calculator performs in parallel the gamma correction calculations for the gray level values 1 to Z. Moreover, since the number of gray levels is limited, the circuit scale of the selector can be also suppressed.

Accordingly, in the aforementioned configuration, it is possible to improve the processing speed of the gamma correction while suppressing increases in power consumption and circuit scale.

The image processing circuit may further includes a RAM configured to hold gain tables for the respective nozzles, each of the gain tables including gain values for gamma correction for the respective gray level values 1 to Z. The calculator may be configured to perform the gamma correction calculations by using the gain values.

The image processing circuit may be implemented in a FPGA, and the calculator and the selector may be formed by using a LUT in the FPGA.

The selector may be a multiplexer and configured to output the selected calculation result as a gamma correction result. The image processing circuit may further include: a RAM configured to hold gain tables for the respective nozzles; an input terminal configured to receive the image data; a first flip-flop configured to receive a gray level value of each of the pixels in the image data from the input terminal, temporarily hold the received gray level value, and then output the gray level value to the multiplexer; a second flip-flop configured to temporarily hold the gamma correction result outputted from the multiplexer; and an output terminal configured to receive the gamma correction result from the second flip-flop and output the gamma correction result to a circuit in a subsequent stage. Each of the gain tables may include gain values for gamma correction based on a gain curve for the respective gray level values 1 to Z. The first flip-flop may be formed by a LUT in the FPGA.

The calculator may include: Z multipliers formed for the respective gray level values 1 to Z, the Z multipliers being configured to, for each of the target pixels, obtain the gain values for the target nozzle from the gain table in the RAM and to perform in parallel the gamma correction calculations of multiplying the gray level values 1 to Z by the obtained gain values respectively; and Z third flip-flops formed for the respective Z multipliers, the Z third flip-flops being configured to temporarily hold the calculation results of the gamma correction calculations performed by the respective Z multipliers. The Z multipliers may be implemented by a fast carry logic.

DETAILED DESCRIPTION

Figure 1:
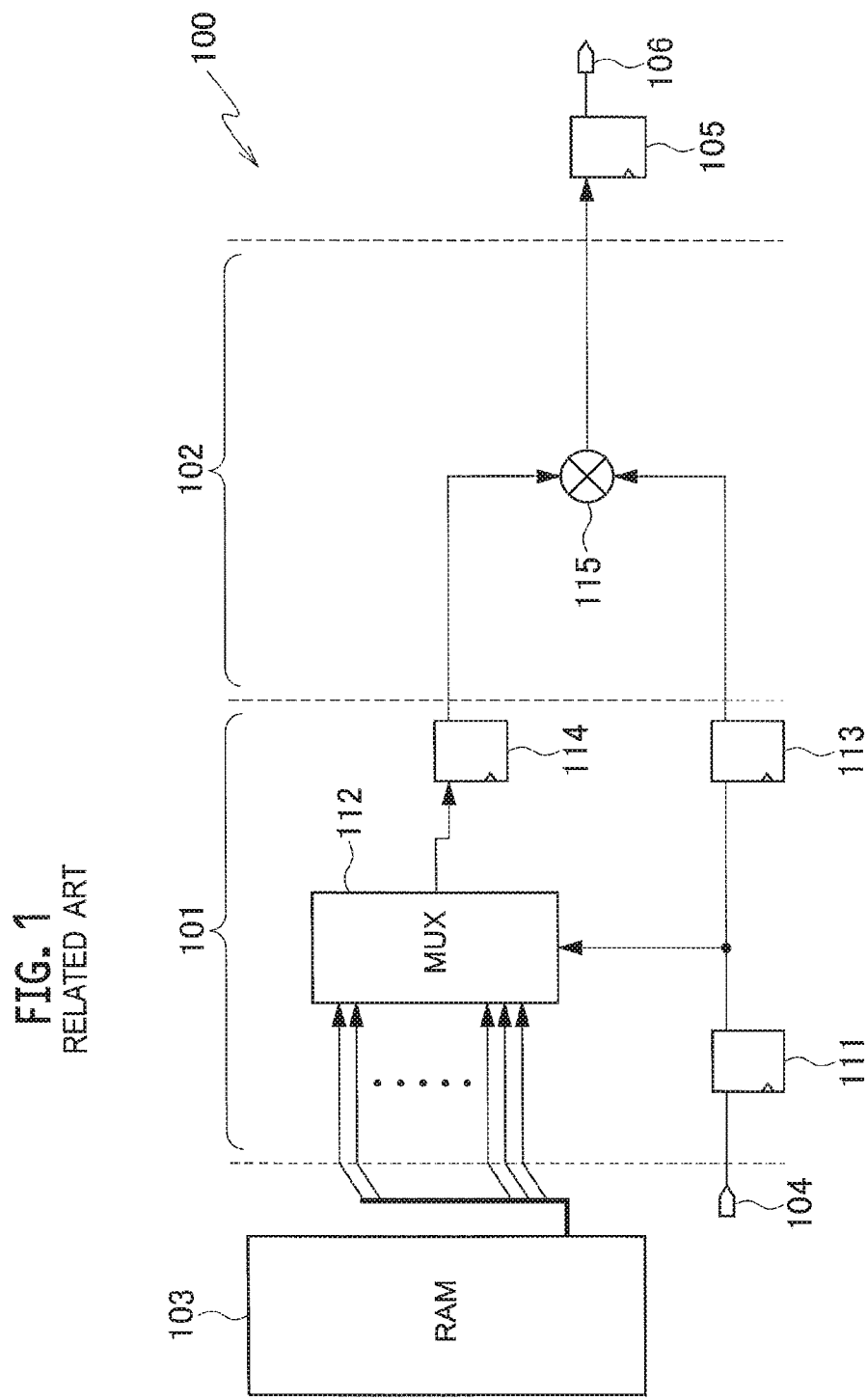
FIG. 1 is a view illustrating an example of an image processing circuit configured to perform gamma correction.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

An embodiment of the present invention is described below with reference to the drawings.

Figure 2:
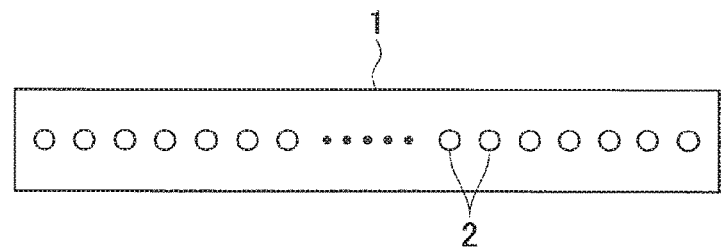
FIG. 2 is a schematic configuration diagram of an inkjet head included in an inkjet printer provided with an image processing circuit in an embodiment of the present invention.
Figure 3:
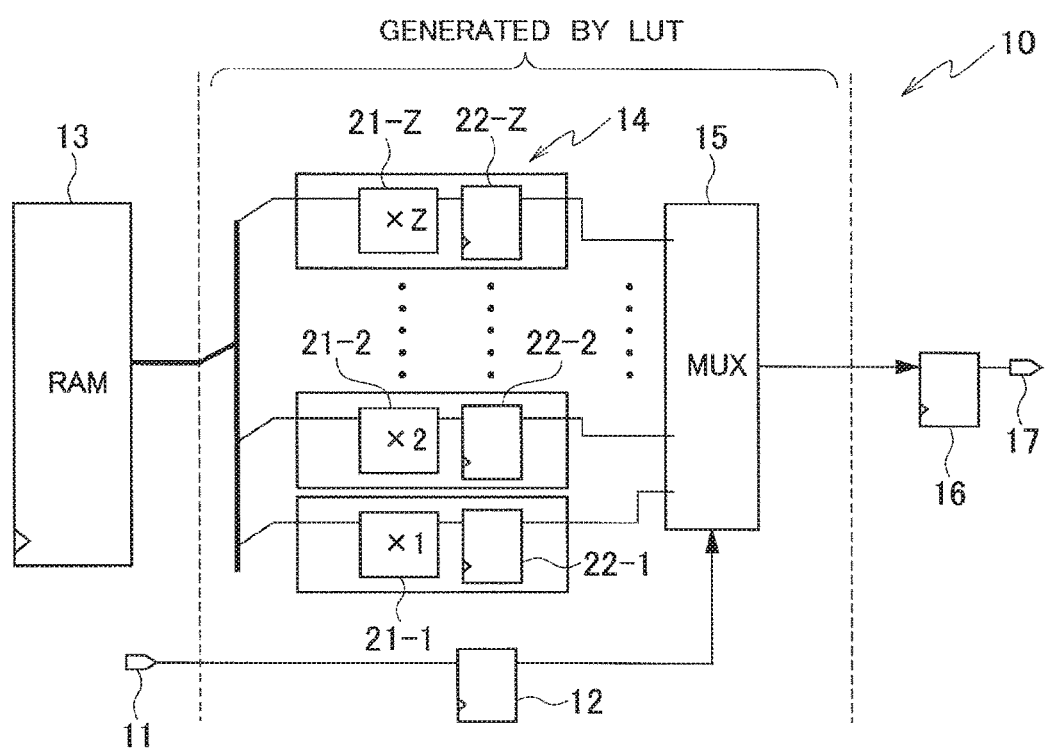
FIG. 3 is a diagram illustrating the image processing circuit in the embodiment.
Figure 4:
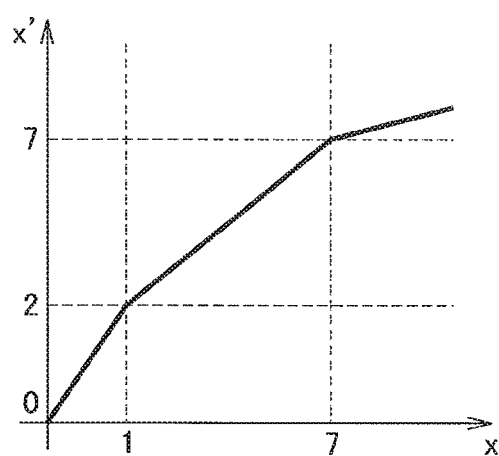
FIG. 4 is a graph illustrating an example of a gain curve.

FIG. 2 is a schematic configuration diagram of an inkjet head 1 included in an inkjet printer provided with an image processing circuit 10 in an embodiment of the present invention. FIG. 3 is a diagram illustrating the image processing circuit 10 in the embodiment. FIG. 4 is a graph illustrating an example of a gain curve. The inkjet printer in the embodiment is, for example, a line inkjet printer. However, the type of the printer is not limited to this and may be, for example, a serial inkjet printer. Moreover, although the inkjet printer of the embodiment includes one inkjet head 1, the number of the inkjet heads is not limited to this and the inkjet printer may include multiple inkjet heads 1.

As illustrated in FIG. 2, the inkjet head 1 has multiple nozzles 2 which eject ink. The inkjet head 1 is a multi-drop inkjet head and performs gradation printing in which the density is expressed by the number of ink droplets ejected per pixel from each nozzle 2.

The image processing circuit 10 illustrated in FIG. 3 performs gamma correction on image data to be printed in the inkjet printer having the inkjet head 1.

The gamma correction is correction in which a gray level value (droplet number) of each pixel in the image data is corrected based on a gain curve like one illustrated in FIG. 4. In FIG. 4, the horizontal axis represents a gray level value (x) before the gamma correction and the vertical axis represents a gray level value (x') after the gamma correction. The gain curve is set according to the output characteristics of each nozzle 2.

As illustrated in FIG. 3, the image processing circuit 10 includes an input terminal 11, a flip-flop 12, a RAM 13, a calculator 14, a multiplexer (selector) 15, a flip-flop 16, and an output terminal 17. The image processing circuit 10 is implemented (packaged) in a field programmable gate array (FPGA). A portion of the image processing circuit 10 excluding the input terminal 11, the RAM 13, the flip-flop 16, and the output terminal 17 are formed by using a look-up table (LUT) in the FPGA.

The input terminal 11 is a terminal into which image data being raster data is inputted. The image data inputted into the input terminal 11 is data including a gray level value (for example, any of 0 to 7) corresponding to the droplet number of the ink for each pixel.

The flip-flop 12 temporarily holds the gray level value in each pixel of the image data received from the input terminal 11 and then outputs the gray level value to the multiplexer 15.

The RAM 13 holds gain tables for the respective nozzles 2. Each of the gain tables holds gain values for respective possible gray level values (respective gray level values 1 to Z below) which are used to perform the gamma correction based on the gain curve like the one illustrated in FIG. 4.

For each of the pixels containing gray level values other than zero (each of target pixels) in the image data, the calculator 14 performs in parallel gamma correction calculations on all possible gray level values other than zero (all the gray level values 1 to Z below), in a manner depending on the nozzle 2 (target nozzle) that is in charge of ink ejection on this pixel (target pixel). When the gray level value of the pixel whose gray level value in the image data is not zero is inputted into the input terminal 11, the calculator 14 performs in parallel the gamma correction calculations on all possible gray level values other than zero, in a manner depending on the nozzle 2 that is in charge of ink ejection on the inputted pixel, in synchronization with the timing of input. The calculator 14 includes Z multipliers 21-1 to 21-Z and Z flip-flops 22-1 to 22-Z.

The multipliers 21-1 to 21-Z are provided for the respective gray level values 1 to Z. Z is the maximum droplet number per pixel in the inkjet head 1. The multipliers 21-1 to 21-Z perform, for each pixel, the gamma correction calculations of multiplying the gray level values associated with the multipliers by the gain values. The gain values of each pixel by which the multipliers 21-1 to 21-Z multiply the gray level values are gain values corresponding to the gray level values associated with the multipliers 21-1 to 21-Z in the nozzle 2 that is in charge of ink ejection for this pixel. The multipliers 21-1 to 21-Z are implemented by a fast carry logic. The multipliers 21-1 to 21-Z perform in parallel (for example, simultaneously or almost simultaneously) the gamma correction calculations on the Z gray level values by using the gain values included in the gain tables stored in the RAM 13, for each pixel.

The flip-flops 22-1 to 22-Z temporarily hold the calculation results of the gamma correction calculations performed by the multipliers 21-1 to 21-Z, respectively.

For each of the pixels containing gray level values other than zero in the image data, the multiplexer 15 makes selection from the calculation results of the gamma correction calculations performed on all possible gray level values of this pixel by the calculator 14, thereby obtaining a calculation result corresponding to the gray level value of this pixel, and outputs this calculation result as a gamma correction result. Moreover, for each of the pixels containing gray level values other than zero in the image data, the multiplexer 15 outputs zero as the gamma correction result. As described above, for each of the pixels containing gray level values other than zero in the image data, the gamma correction calculations on the Z gray level values are performed in parallel to calculate Z calculation results. However, the calculation result corresponding to the gray level value of the pixel in the image data is the only calculation result to be actually used.

The flip-flop 16 temporarily holds the gamma correction result outputted from the multiplexer 15.

The output terminal 17 receives the gamma correction result for each pixel from the flip-flop 16 and outputs it to a circuit in a subsequent stage.

Next, operations of the image processing circuit 10 are described.

When the gamma correction is performed in the image processing circuit 10, the gray level values of the respective pixels in the image data are sequentially inputted into the input terminal 11.

When the gray level value of the pixel whose gray level value is not zero is inputted into the input terminal 11, the calculator 14 performs in parallel the gamma correction calculations on all possible gray level values other than zero, in a manner depending on the nozzle 2 that is in charge of ink ejection on the inputted pixel, in synchronization with the timing of the input.

Specifically, the multipliers 21-1 to 21-Z obtain the gain values for the nozzle 2 that is in charge of ink ejection for the input pixel, from the gain table in the RAM 13. In this case, each of the multipliers 21-1 to 21-Z obtains the gain value corresponding to the gray level value associated with the multiplier. For example, the multiplier 21-1 obtains a gain value corresponding to the gray level value "1," while the multiplier 21-Z obtains a gain value corresponding to the gray level value "Z."

Next, each of the multipliers 21-1 to 21-Z performs the gamma correction calculation of multiplying the gray level value associated with the multiplier by the gain value obtained from the gain table. For example, the multiplier 21-1 multiplies the gray level value "1" by the gain value corresponding thereto, while the multiplier 21-Z multiplies the gray level value "Z" by the gain value corresponding thereto. The multipliers 21-1 to 21-Z output the calculations results of the gamma correction calculations to the flip-flops 22-1 to 22-Z, respectively.

Meanwhile, the gray level value of the pixel inputted into the input terminal 11 is temporarily held in the flip-flop 12 and then outputted to the multiplexer 15.

In the case where the gray level value of the inputted pixel is not zero, the calculation results of the gamma correction calculations, performed on the gray level values other than zero in a manner depending on the nozzle 2 that is in charge of ink ejection on the inputted pixel, are held in the flip-flops 22-1 to 22-Z when the gray level value of the pixel is inputted into the multiplexer 15.

The multiplexer 15 makes selection and obtains the computation result corresponding to the gray level value of the input pixel from the flip-flops 22-1 to 22-Z. Then, the multiplexer 15 outputs the obtained calculation result to the flip-flop 16 as the gamma correction result.

In the case where the gray level value of the input pixel is zero, the multiplexer 15 outputs zero to the flip-flop 16 as the gamma correction result.

The gamma correction result outputted from the multiplexer 15 is temporarily held in the flip-flop 16 and is then outputted to the circuit in the subsequent stage by the output terminal 17.

The aforementioned processing is performed for all pixels in the image data.

As described above, in the image processing circuit 10, for each of the pixels containing gray level values other than zero in the image data, the calculator 14 performs in parallel the gamma correction calculations on all possible gray level values other than zero, in a manner depending on the nozzle 2 that is in charge of ink ejection for this pixel. Then, the multiplexer 15 makes selection from the calculation results of the gamma correction calculations performed on all possible gray level values of this pixel by the calculator 14, thereby obtaining a calculation result corresponding to the gray level value of the pixel as the gamma correction result.

Since the calculator 14 performs the calculation in which the multiplicand (gray level value) is fixed in each of the multipliers 21-1 to 21-Z, the calculator 14 can be achieved by using a fast carry logic instead of a hardware multiplier in a FPGA. This can avoid signal wiring delay due to limitations in the position of the hardware multiplier in the FPGA which occurs when the hardware multiplier is used to perform the gamma correction calculations.

Accordingly, the processing speed of the gamma correction can be increased by using a low-cost FPGA instead of a high-cost FPGA on which a high-speed circuit or a large-scale circuit is mounted. Hence, it is possible to increase the processing speed of the gamma correction while suppressing increases in power consumption and circuit scale which occur when a high-cost FPGA is used.

Moreover, in the image data to be printed by the multi-drop inkjet head 1, the number of gray levels is limited to a certain extent (for example, 16 or less). Accordingly, the circuit scale of the calculator 14 can be suppressed when the multipliers 21-1 to 21-Z corresponding to all possible gray level values other than zero are provided in the calculator 14 in a low-cost FPGA. Moreover, since the number of gray levels is limited, the circuit scale of the multiplexer 15 can be also suppressed.

Accordingly, the image processing circuit 10 can improve the processing speed of the gamma correction while suppressing increases in power consumption and circuit scale.

In the embodiment described above, the inkjet printer has the configuration which includes one inkjet head 1 and in which only one nozzle 2 corresponds to each pixel. However, the configuration is not limited to this. For example, the inkjet printer may have a configuration which includes one inkjet head having multiple rows (for example, rows configured to eject inks of different colors) of the nozzles 2 illustrated in FIG. 2 and in which the multiple nozzles 2 correspond to (eject the inks for) each pixel. Moreover, the inkjet printer may have a configuration which includes multiple inkjet heads 1 (for example, inkjet heads configured to eject inks of different colors) and in which multiple nozzles 2 correspond to (eject the inks for) each pixel. In the configurations in which multiple nozzles 2 correspond to each pixel, for example, each of the multipliers 21-1 to 21-Z performs the gamma correction calculation of multiplying the gray level value associated with the multiplier by the gain value, for each pixel and for each of the nozzles 2 corresponding to this pixel.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image processing circuit comprising:
a calculator configured to perform in parallel gamma correction calculations on gray level values 1 to Z depending on each of target nozzles for each of target pixels containing gray level values other than zero of pixels in ink-droplet image data to be printed by a multi-drop inkjet head including nozzles and having a maximum droplet number Z per pixel, the nozzles of the multi-drop inkjet head including the target nozzles for ink ejection on the respective target pixels; and
a selector configured to select a calculation result corresponding to a gray level value of the target pixel from calculation results of the gamma correction calculations performed on the gray level values 1 to Z by the calculator, for each of the target pixels.

2. The image processing circuit according to claim 1, further comprising a RAM configured to hold gain tables for the respective nozzles, each of the gain tables including gain values for gamma correction for the respective gray level values 1 to Z,
wherein the calculator is configured to perform the gamma correction calculations by using the gain values.

3. The image processing circuit according to claim 1, wherein
the image processing circuit is implemented in a FPGA, and
the calculator and the selector are formed by using a LUT in the FPGA.

4. An image processing circuit comprising:
a calculator configured to perform in parallel gamma correction calculations on gray level values 1 to Z depending on each of target nozzles for each of target pixels containing gray level values other than zero of pixels in image data to be printed by a multi-drop inkjet head including nozzles and having a maximum droplet number Z per pixel, the nozzles of the multi-drop inkjet head including the target nozzles for ink ejection on the respective target pixels; and
a selector configured to select a calculation result corresponding to a gray level value of the target pixel from calculation results of the gamma correction calculations performed on the gray level values 1 to Z by the calculator, for each of the target pixels, wherein
the image processing circuit is implemented in a FPGA,
the calculator and the selector are formed by using a LUT in the FPGA,
the selector is a multiplexer and configured to output the selected calculation result as a gamma correction result,
the image processing circuit further comprises:
a RAM configured to hold gain tables for the respective nozzles;
an input terminal configured to receive the image data;
a first flip-flop configured to receive a gray level value of each of the pixels in the image data from the input terminal, temporarily hold the received gray level value, and then output the gray level value to the multiplexer;
a second flip-flop configured to temporarily hold the gamma correction result outputted from the multiplexer; and
an output terminal configured to receive the gamma correction result from the second flip-flop and output the gamma correction result to a circuit in a subsequent stage,
each of the gain tables includes gain values for gamma correction based on a gain curve for the respective gray level values 1 to Z, and
the first flip-flop is formed by a LUT in the FPGA.

5. The image processing circuit according to claim 4, wherein the calculator comprises:
- Z multipliers formed for the respective gray level values 1 to Z, the Z multipliers being configured to, for each of the target pixels, obtain the gain values for the target nozzle from the gain table in the RAM and to perform in parallel the gamma correction calculations of multiplying the gray level values 1 to Z by the obtained gain values respectively; and
- Z third flip-flops formed for the respective Z multipliers, the Z third flip-flops being configured to temporarily hold the calculation results of the gamma correction calculations performed by the respective Z multipliers, and
- the Z multipliers are implemented by a fast carry logic.

* * * * *